United States Patent
Wakita et al.

(10) Patent No.: US 9,878,756 B2
(45) Date of Patent: Jan. 30, 2018

(54) FRONT STRUCTURE OF MOTORCYCLE

(71) Applicant: HONDA MOTOR CO., LTD., Tokyo (JP)

(72) Inventors: Nobutaka Wakita, Wako (JP); Kenji Tako, Wako (JP); Yasuhiro Sato, Wako (JP); Masato Nagata, Wako (JP); Hiroyuki Iwasaki, Wako (JP); Tomohiro Sone, Wako (JP); Kihoko Kaita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/063,643

(22) Filed: Mar. 8, 2016

(65) Prior Publication Data

US 2016/0264199 A1    Sep. 15, 2016

(30) Foreign Application Priority Data

Mar. 11, 2015 (JP) .................................. 2015-048752

(51) Int. Cl.
*B62J 15/00* (2006.01)
*B62J 15/02* (2006.01)
*B62J 17/02* (2006.01)

(52) U.S. Cl.
CPC .............. *B62J 15/00* (2013.01); *B62J 15/02* (2013.01); *B62J 17/02* (2013.01)

(58) Field of Classification Search
CPC ............. B62J 15/00; B62J 15/02; B62J 17/02
USPC ....................................................... 280/281.1
See application file for complete search history.

(56) References Cited

U.S. PATENT DOCUMENTS

| | | | |
|---|---|---|---|
| 4,564,081 A * | 1/1986 | Hamane ..................... | B62J 7/00 180/229 |
| 4,770,460 A | 9/1988 | Miura et al. | |
| 2006/0000652 A1* | 1/2006 | Yamaguchi .............. | B62J 15/00 180/68.3 |

FOREIGN PATENT DOCUMENTS

| | | |
|---|---|---|
| JP | 60-174691 U | 11/1985 |
| JP | 62-121177 U | 7/1987 |
| JP | 2-105083 U | 8/1990 |
| JP | 2006-015930 A | 1/2006 |

* cited by examiner

*Primary Examiner* — Joseph M Rocca
*Assistant Examiner* — Felicia L. Brittman
(74) *Attorney, Agent, or Firm* — Birch, Stewart, Kolasch & Birch, LLP

(57) ABSTRACT

A front structure of a motorcycle where a larger amount of air can be directed to the inside without increasing the size of the vehicle. A front structure of a motorcycle includes a front fork steerably mounted on a front portion of a vehicle body frame and supporting a front wheel thereon. A front fender is provided for protection from mud being splashed by the front wheel. A duct, through which air flows, is formed on a side surface of the front fender. An air intake opening, for taking in the flow of air, is formed on a front end of the duct with an air discharge opening directed inwardly in the vehicle width direction being formed on a rear end of the duct. The rear end of the duct opens to an inside of an inner surface of the front fork.

17 Claims, 12 Drawing Sheets

FRONT STRUCTURE OF MOTORCYCLE

CROSS-REFERENCE TO RELATED APPLICATIONS

The present application claims priority under 35 USC 119 to Japanese Patent Application No. 2015-048752 filed Mar. 11, 2015 the entire contents of which are hereby incorporated by reference.

BACKGROUND OF THE INVENTION

1. Field of the Invention

The present invention relates to an improvement of the front structure of a motorcycle.

2. Description of Background Art

A front structure of a motorcycle is known wherein an air guide passage through which a flow of air is guided to an engine is formed in an upper portion of a front fender. See, for example, JP-A-2006-15930, FIGS. 3 and 4.

As shown in FIGS. 3 and 4 of JP-A-2006-15930, an upper fender (43) which avoids mud from splashing up from a front wheel (1) is mounted on a front fork (2) with a visor (42) on which a headlight is mounted from above being mounted on the upper fender (43) (numerals with parenthesis indicating symbols described in JP-A-2006-15930, the same indication adopted hereinafter). A recessed portion (54) is formed on an upper surface of the upper fender (43), and a flow of air (W) is guided to an engine (7) using an air guide passage (56) formed of the recessed portion (54) and a visor lower portion (55) which forms a lower portion of the visor (42).

In the technique described in JP-A-2006-15930, the air guide passage (56) is formed above the upper fender (43), and a length of the air guide passage (56) is limited to a maximum of a length of the upper fender (43) in the vehicle width direction. In view of such a circumstance, there has been a demand for a structure which can exhibit a larger flow straightening effect.

SUMMARY AND OBJECTS OF THE INVENTION

It is an object of an embodiment of the present invention to provide the front structure of a motorcycle wherein a larger amount of a flow of air can be directed to the inside of a vehicle without increasing the size of the vehicle.

According to an embodiment of the present invention, a front structure of a motorcycle includes a front fork steerably supported on a front portion of a vehicle body frame for supporting a front wheel thereon. A front fender is mounted on the front fork for avoiding mud from being splashes up by the front wheel. A duct, through which a flow of air flows, is formed on a side surface of the front fender such that the duct projects sideward in a lateral direction of a vehicle. An air intake opening, for taking in the flow of air, is formed on a front end of the duct with an air discharge opening being directed inwardly in the vehicle width direction on a rear end of the duct.

According to an embodiment of the present invention, the rear end of the duct opens to an inside of an inner surface of the front fork in the vehicle width direction or to an outside of an outer surface of the front fork in the vehicle width direction.

According to an embodiment of the present invention, the inner surface or the outer surface of the front fork in the vehicle width direction includes a planar surface, and a rear end of the duct is formed contiguously with the planar surface.

According to an embodiment of the present invention, the duct has a front guide portion projecting toward a front side in a longitudinal direction of the vehicle at the air intake opening.

According to an embodiment of the present invention, the front guide portion has an extending ceiling portion extending from a ceiling portion of the duct and an extending bottom portion extending from a bottom surface of the duct, and an outer side surface in the vehicle width direction which extends between the extending ceiling portion and the extending bottom portion is opened.

According to an embodiment of the present invention, the duct has a rear guide portion extending rearwardly in the longitudinal direction of the vehicle such that the rear guide portion extends to the outside of the front fork in the vehicle width direction.

According to an embodiment of the present invention, a recessed portion directed to a member to be cooled of the vehicle is formed on a rear portion of an outer surface of an upper portion of the front fender.

According to an embodiment of the present invention, a sub fender extending toward an area behind the front fender is further mounted on the front fork contiguously with the front fender, and a lower surface of a rear edge portion of the front fender is joined to an upper surface of a front edge portion of the sub fender. A fender mounting portion on which a rear surface of a front edge portion of the sub fender is mounted is provided to the front fork.

According to an embodiment of the present invention, a mounting flange extends upwardly and is mounted on the front fork. The mounting flange is provided to an upper surface of the sub fender with a boss portion on which the mounting flange is mounted by a fastening member being provided to the front fork. A positioning and holding portion which positions the front fender with respect to the sub fender and holds the front fender on the sub fender by making a portion to be positioned extending in a height direction is formed on the front fender engage with the mounting flange from above being attached to the sub fender.

According to an embodiment of the present invention, the positioning and holding portion has a box shape, and is formed of a front wall; a rear wall arranged to opposedly face the front wall; one side wall extending between one end of the front wall and one end of the rear wall; the other side wall extending between the other end of the front wall and the other end of the rear wall; and a bottom wall extending between a lower end of the front wall, a lower end of the rear wall and lower ends of said one and the other side walls. The mounting flange is formed on the rear wall, and the positioning and holding portion is formed on the bottom wall.

According to an embodiment of the present invention, a duct, which projects sideward in the lateral direction of the vehicle, is formed on the side surface of the front fender. By forming the duct such that the duct projects sideward in the lateral direction of the vehicle, compared to the case where the duct is formed on an upper surface of the fender, it is possible to form the duct with a wide flow passage area without increasing the size of the vehicle. By increasing the flow passage area of the duct, a flow straightening effect can be increased. Accordingly, a member to be cooled such as a radiator arranged in the inside of the vehicle can be effectively cooled without increasing the size of the vehicle.

According to an embodiment of the present invention, the rear end of the duct opens to the inside of the inner surface of the front fork in the vehicle width direction or to the outside of the outer surface of the front fork in the vehicle width direction. Accordingly, a flow of air which flows through the duct minimally impinges on the front fork after being discharged from the rear end of the duct. Thus, it is possible to accurately direct a flow of air to a member to be cooled which requires cooling. As a result, the member to be cooled can be effectively cooled.

According to an embodiment of the present invention, a flow of air which flows out from the rear end of the duct is smoothly guided toward a rear side of the vehicle along the planar surface of the front fork arranged contiguously with the duct. More specifically, the front fork can be used as a part of the guide for guiding a flow of air. Thus, the flow of air can be guided more efficiently.

According to an embodiment of the present invention, the duct has the front guide portion projecting toward a front side in the longitudinal direction of the vehicle at the air intake opening of the duct. Accordingly, a flow of air is guided into the air intake opening by being guided by the front guide portion. As a result, the flow of air can be effectively guided to the air intake opening.

According to an embodiment of the present invention, the outer side surface in the vehicle width direction of the front guide portion for taking in a flow of air is opened. By forming the outer side surface which is opened in the vehicle width direction, in addition to the flow of air from a front side of the vehicle, a flow of air from a side of the vehicle can be effectively taken into the air intake opening.

According to an embodiment of the present invention, the duct has the rear guide portion extending rearwardly in the longitudinal direction of the vehicle such that the rear guide portion extends to the outside of the front fork in the vehicle width direction. With the provision of the rear guide portion, a flow of air leaked to the outside of the front fork can also be accurately guided to a member to be cooled of the vehicle.

According to an embodiment of the present invention, the recessed portion directed to a member to be cooled is formed on a rear portion of the outer surface of the upper portion of the front fender. A flow of air which impinges on the rear portion of the outer surface of the upper portion of the front fender is directed to the member to be cooled by being guided by the recessed portion. As a result, a flow of air which passes the outside of the front fender can be also more accurately directed to the member to be cooled.

According to an embodiment of the present invention, the sub fender is mounted on the front fork, and the front fender is joined to the sub fender. More specifically, the front fender having the duct and the sub fender adopt the split structure. By adopting the split structure, a molding die can be simplified, and the front fender can be easily formed by molding. Along with such an advantageous effect, the degree of freedom in designing the duct formed on the side of the front fender is increased. Thus, the duct can be large-sized without difficulty. By making the large-sized duct, an effect of straightening the flow of a flow of air can be increased.

According to an embodiment of the present invention, the mounting flange extending upwardly is formed on the upper surface portion of the sub fender. By extending the mounting flange upwardly, for example, compared to a case where the mounting flange extends downwardly, the sub fender can be easily mounted on the front fork.

By attaching the positioning and holding portion to the mounting flange and by making the portion to be positioned of the front fender engage with the positioning and holding portion from above, the front fender can be positioned by and held on the sub fender. By setting the front fender on the sub fender from above, the front fender can be easily positioned with respect to the sub fender and can be easily held on the sub fender. As a result, assembling operability of the front fender and the sub fender can be improved.

According to an embodiment of the present invention, the positioning and holding portion has a box shape, and is formed of the front wall; the rear wall; one side wall; the other side wall; and the bottom wall. More specifically, the positioning and holding portion is formed into a box shape, and the portion to be positioned is engaged with the positioning and holding portion having a box shape. With such a structure, strength of the joining portion can be increased, the joining portion can be miniaturized, and the number of mounting portions for mounting the fender to the front fork can be reduced. As a result, a large-sizing of the duct and enhancement of the assembling property of the front fender and the sub fender can be realized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of the invention is explained in detail. In drawings and the embodiment, the directions of "up," "down," "front," "rear," "left" and "right" indicate directions as viewed from a rider riding on a motorcycle.

The embodiment of the invention is explained with reference to the drawings.

Figure 1:
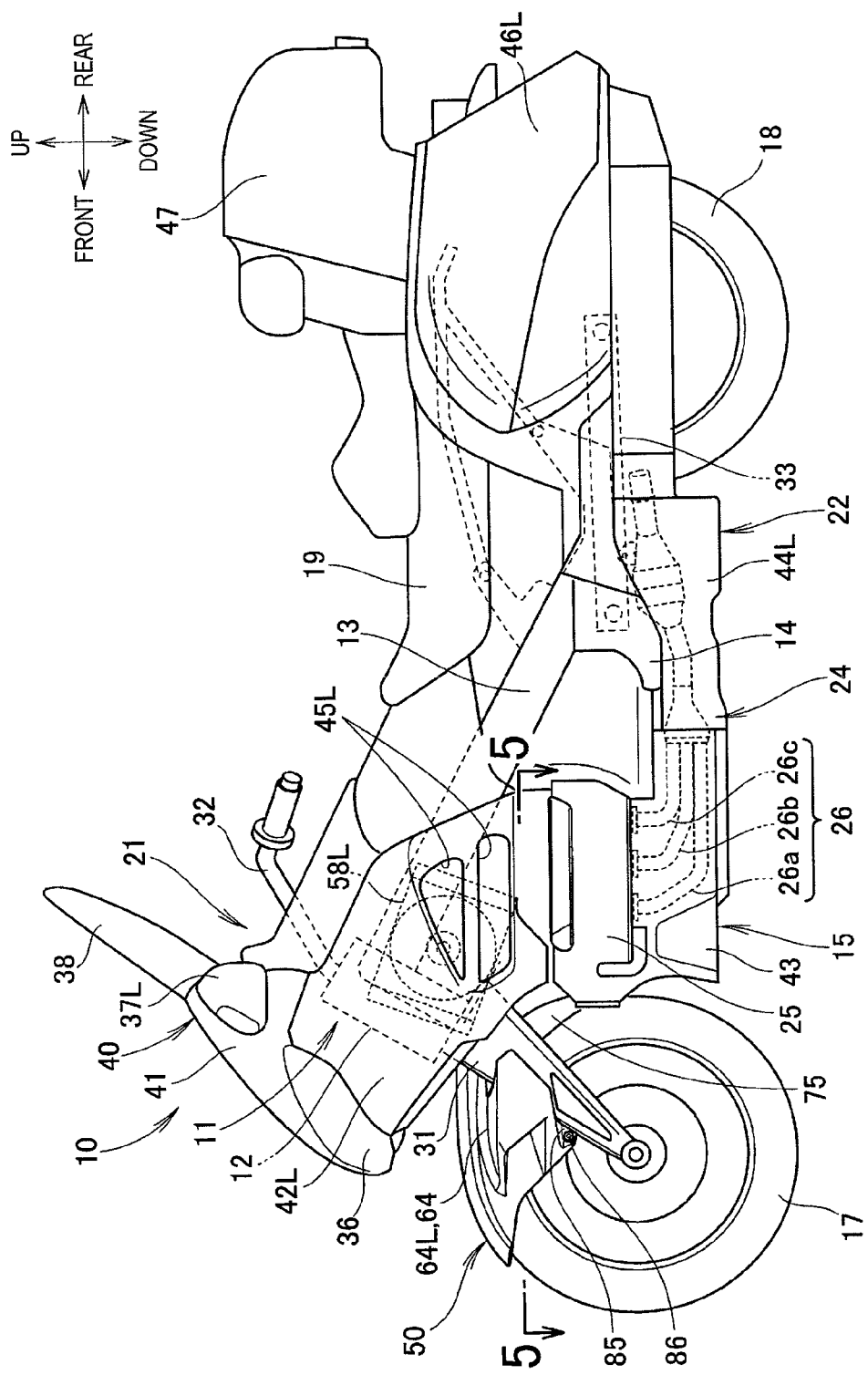
FIG. 1 is a left side view of a motorcycle according to the invention.

As shown in FIG. 1, a motorcycle 10 is a saddle-ride-type vehicle where a vehicle body frame 11 includes a main frame 13 extending toward a rear side of the vehicle from a head pipe 12; and a pivot frame 14 extending downwardly from the main frame 13 and an engine 15 is suspended from the vehicle body frame 11. A front wheel steering portion 21, including a front wheel 17, is mounted on the head pipe 12 in a steerable manner. A rear wheel suspension portion 22, including a rear wheel 18, is supported on the pivot frame 14 in a swingable manner with a seat 19 being mounted on the vehicle body frame 11 between the front wheel 17 and the rear wheel 18. A rider rides on the vehicle in a state where the rider sits on the seat 19 in a straddling manner. An exhaust device 24 is connected to the engine 15. The exhaust device 24 includes exhaust pipes 26 (26a, 26b, 26c) which extend downward from a cylinder portion 25 of the engine 15 and, thereafter, extend rearwardly.

The front wheel steering portion 21 which is mounted on the vehicle body frame 11 in a steerable manner includes, as main constitutional elements thereof a front fork 31 which is mounted on the head pipe 12 in a rotatable manner; the front wheel 17 which is supported on a lower end of the front fork 31 and a steering handle 32 which is mounted on an upper end of the front fork 31. The rear wheel suspension portion 22 includes a swing arm 33 extending toward the rear side in the longitudinal direction of the vehicle from the pivot frame 14 with the rear wheel 18 being supported on a rear end portion of the swing arm 33.

A vehicle body cover 40 for covering a vehicle body includes a front cowl 41; left and right front side cowls 42L, 42R (only symbol 42L, indicating the side cowl on a viewer's side, is shown in the drawing) which extend toward the rear side in the longitudinal direction of the vehicle from the front cowl 41 up to an area above the engine 15; an under cowl 43 which covers an area below the engine 15 and the exhaust device 24; and left and right protectors 44L, 44R (only symbol 44L, indicating the protector on a viewer's side, is shown in the drawing) which are arranged contiguously with a rear side of the under cowl 43 and cover the exhaust device 24. Radiator openings 45L, 45R (only symbol 45L, indicating the radiator opening on a viewer's side, is shown in the drawing) through which air entering and exiting left and right radiators 58L, 58R (only symbol 58L, indicating the radiator on a viewer's side, is shown in the drawing) passes are formed in the left and right front side cowls 42L, 42R, respectively.

The engine 15 is a horizontally opposed 4-cycle 6-cylinder engine where a crankshaft of the engine 15 extends in the longitudinal direction of the vehicle. The left and right radiators 58L, 58R for cooling the engine 15 are arranged respectively on sides of the engine 15 in the lateral direction of the vehicle and above the engine 15. The left and right radiators 58L, 58R are side radiators each of which has an air receiving surface arranged parallel to the longitudinal direction of the vehicle, and the left and right radiators 58L, 58R are supported on the main frame 13. The left and right radiators 58L, 58R are arranged such that the air receiving surfaces are surrounded by the left and right front side cowls 42L, 42R respectively and are made to face a space which communicates with an air guide opening disposed on a front side of the vehicle and is defined inside the vehicle width direction, and air discharging surfaces are made to face outside in the vehicle width direction. A flow of air introduced through the air guide opening is made to pass the left and right radiators 58L, 58R from the inside to the outside in the vehicle width direction thus cooling the left and right radiators 58L, 58R.

Left and right trunks 46L, 46R (only symbol 46L indicating the trunk on a viewer's side shown in the drawing) for storing articles are disposed on lateral sides of the rear wheel 18 on a rear side of the vehicle, and a rear trunk 47 is disposed above the left and right trunks 46L, 46R. A front fender 50, which avoids mud from being splashed up by the front wheel 17, is mounted on the front fork 31.

Figure 2:
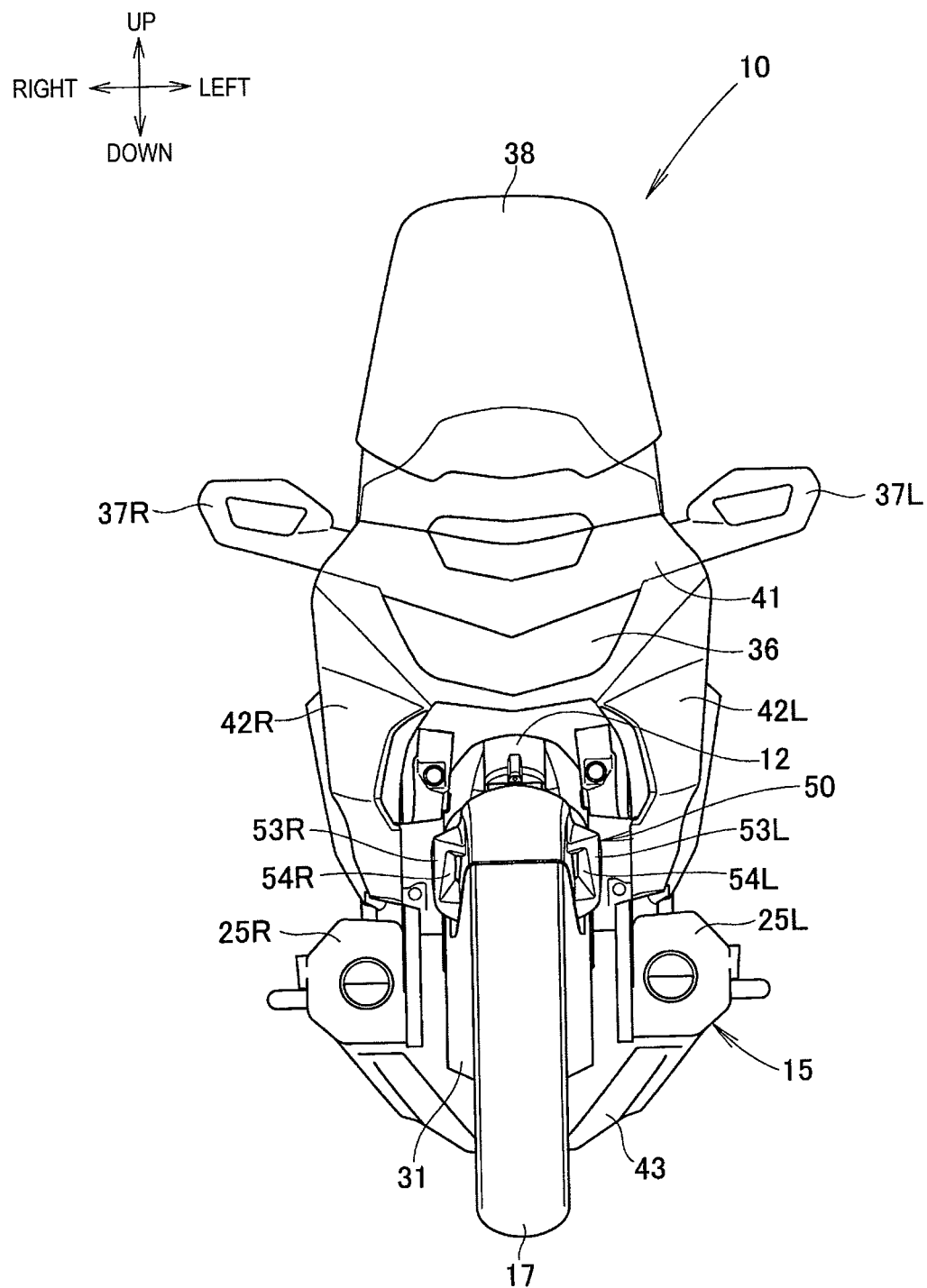
FIG. 2 is a front view of the motorcycle according to the invention.

As shown in FIG. 2, as viewed in a front view of the vehicle, a headlight 36 is disposed at the center of the front cowl 41 in the vehicle width direction, and left and right rear-view mirrors 37L, 37R for visually checking areas behind the vehicle extend toward left and right sides of the front cowl 41 in the vehicle width direction. A wind shield glass 38 for wind shielding extends upwardly from the front cowl 41.

Hereinafter, the structure and the like of the front fender are explained in detail.

Figure 3:
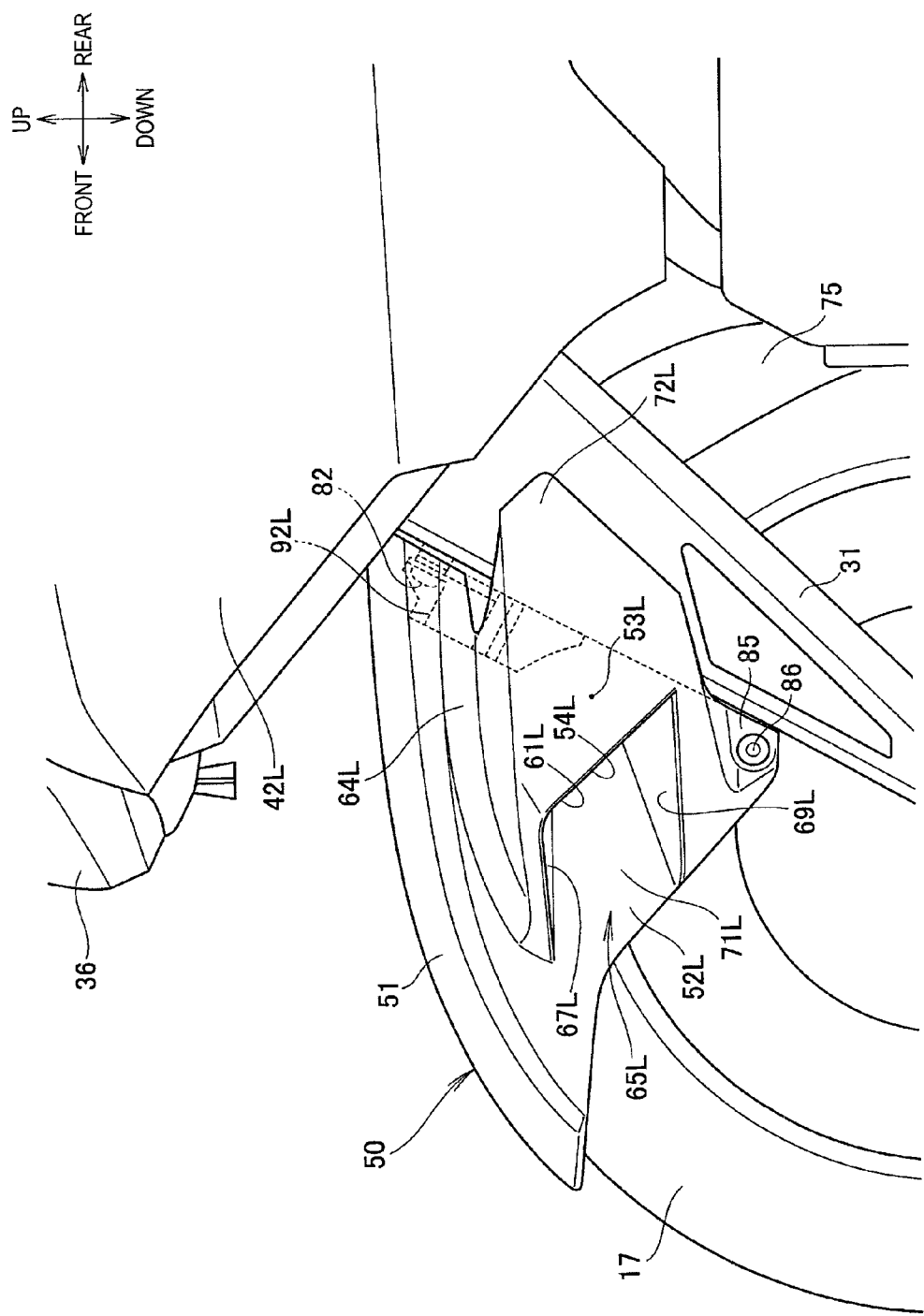
FIG. 3 is an enlarged view of an essential part shown in FIG. 1.
Figure 4:
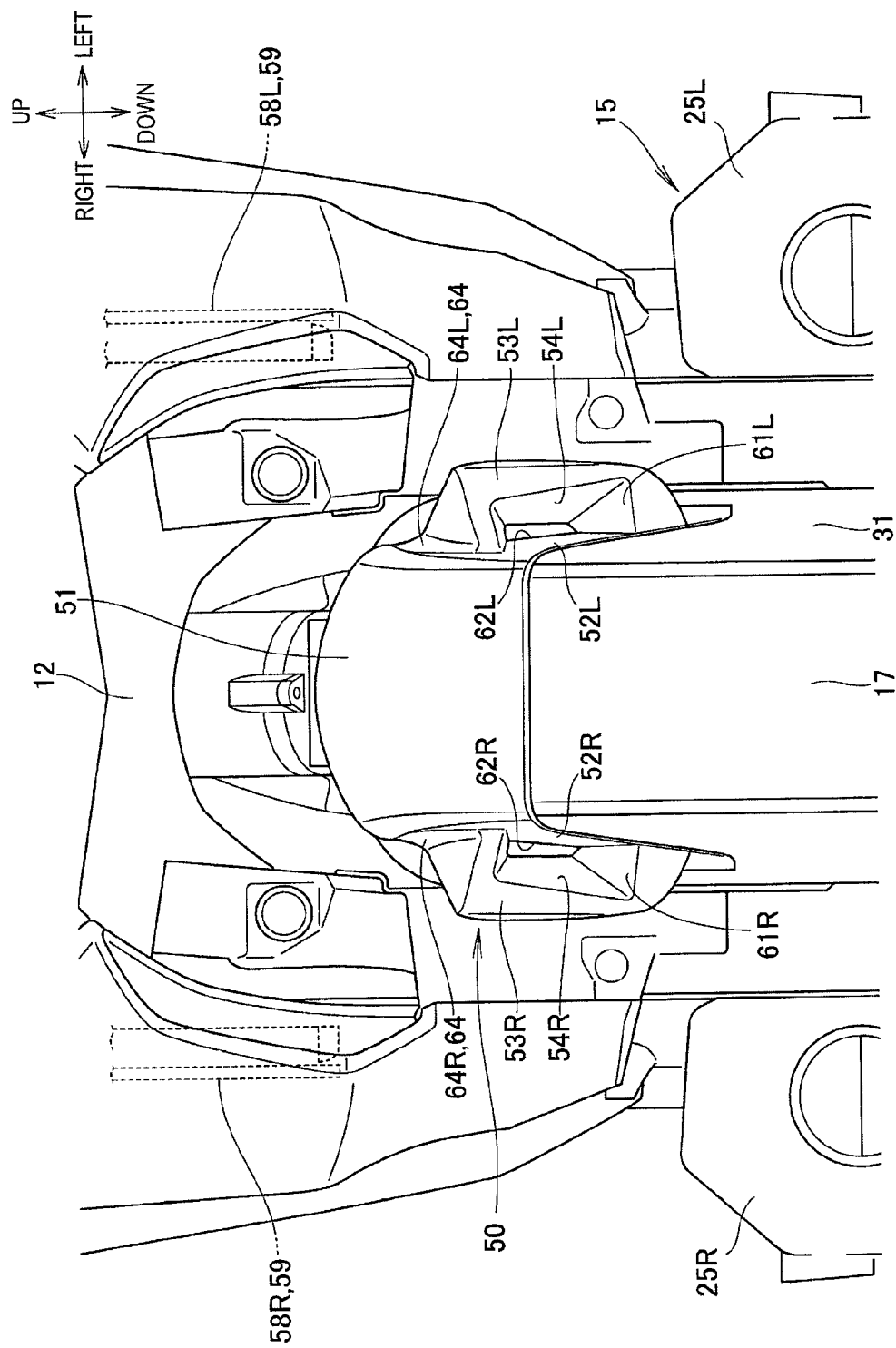
FIG. 4 is an enlarged view of an essential part shown in FIG. 2.

As shown in FIG. 3 and FIG. 4, the front fender 50 is a member which is mounted on the front fork 31, covers the front wheel 17 from above following a profile of the front wheel 17, and avoids mud from being splashed up by the front wheel 17. The front fender 50 is formed of an upper covering portion 51 for covering the front wheel 17 from above; left and right covering portions 52L, 52R which extend downwardly from left and right end portions of the upper covering portion 51 in the vehicle width direction; and left and right projecting portions 53L, 53R which extend outward in the left and right directions in the vehicle width direction from these left and right covering portions 52L, 52R.

An upper portion of the front fender 50 has a shape which conforms to the profile of the front wheel 17. By making the upper portion of the front fender 50 conform to the front wheel 17, a thickness of the upper portion of the front fender 50 can be made thin. As a result, a vehicle height can be suppressed to a small height.

The left and right projecting portions 53L, 53R are portions projecting from the left and right covering portions 52L, 52R which form side surfaces of the front fender 50, and left and right ducts 54L, 54R through which a flow of air flows are formed in these left and right projecting portions 53L, 53R, respectively. More specifically, the ducts 54L, 54R through which a flow of air flows are formed such that the ducts 54L, 54R project sideward in the lateral direction of the vehicle.

Figure 5:
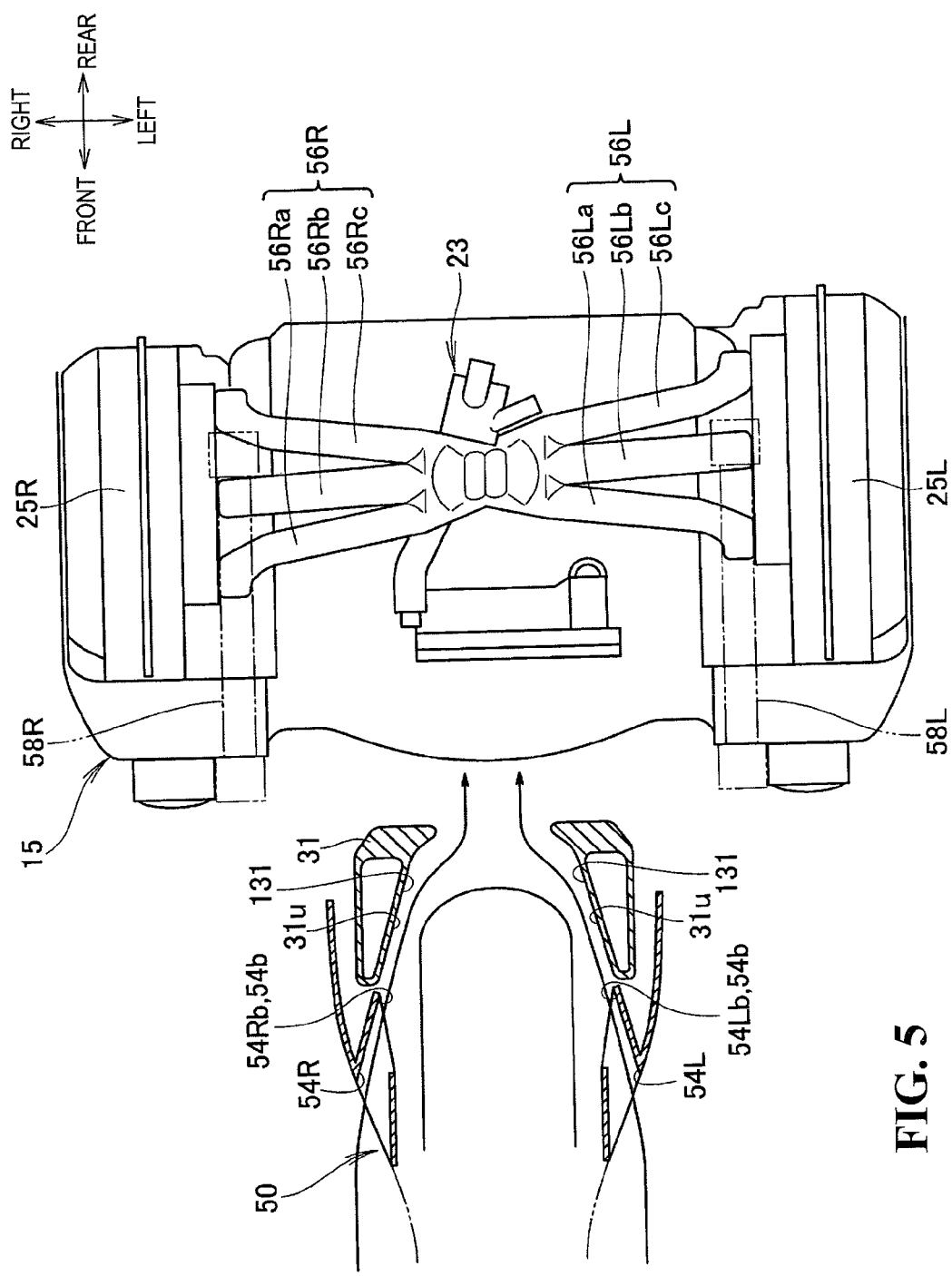
FIG. 5 is a plan view taken along a line 5-5 in FIG. 1 showing a front fender with a part broken away.

As shown in FIG. 5, the front fork 31 is arranged behind the left and right ducts 54L, 54R which are formed integrally with the front fender 50. Rear ends 54Lb, 54Rb of the left and right ducts 54L, 54R open more to the inside than inner surfaces 31u of the front fork 31. The inner surfaces 31u of the front fork 31 in the vehicle width direction include planar surfaces 131, 131, and the rear ends of the ducts 54L, 54R are contiguously formed with the planar surfaces 131, 131.

There is no problem in making the rear ends of the left and right ducts open more to the outside than outer surfaces of the front fork.

The engine 15 which is a power unit is arranged behind the front fender 50 having the left and right ducts 54L, 54R in the longitudinal direction of the vehicle. An intake device 23 is disposed above the engine 15. The intake device 23 includes connecting tubes 56La, 56Lb, 56Lc, 56Ra, 56Rb, 56Rc through which air-fuel mixture is supplied to cylinder portions 25L, 25R disposed on left and right sides of the intake device 23 in the vehicle width direction.

Figure 6:
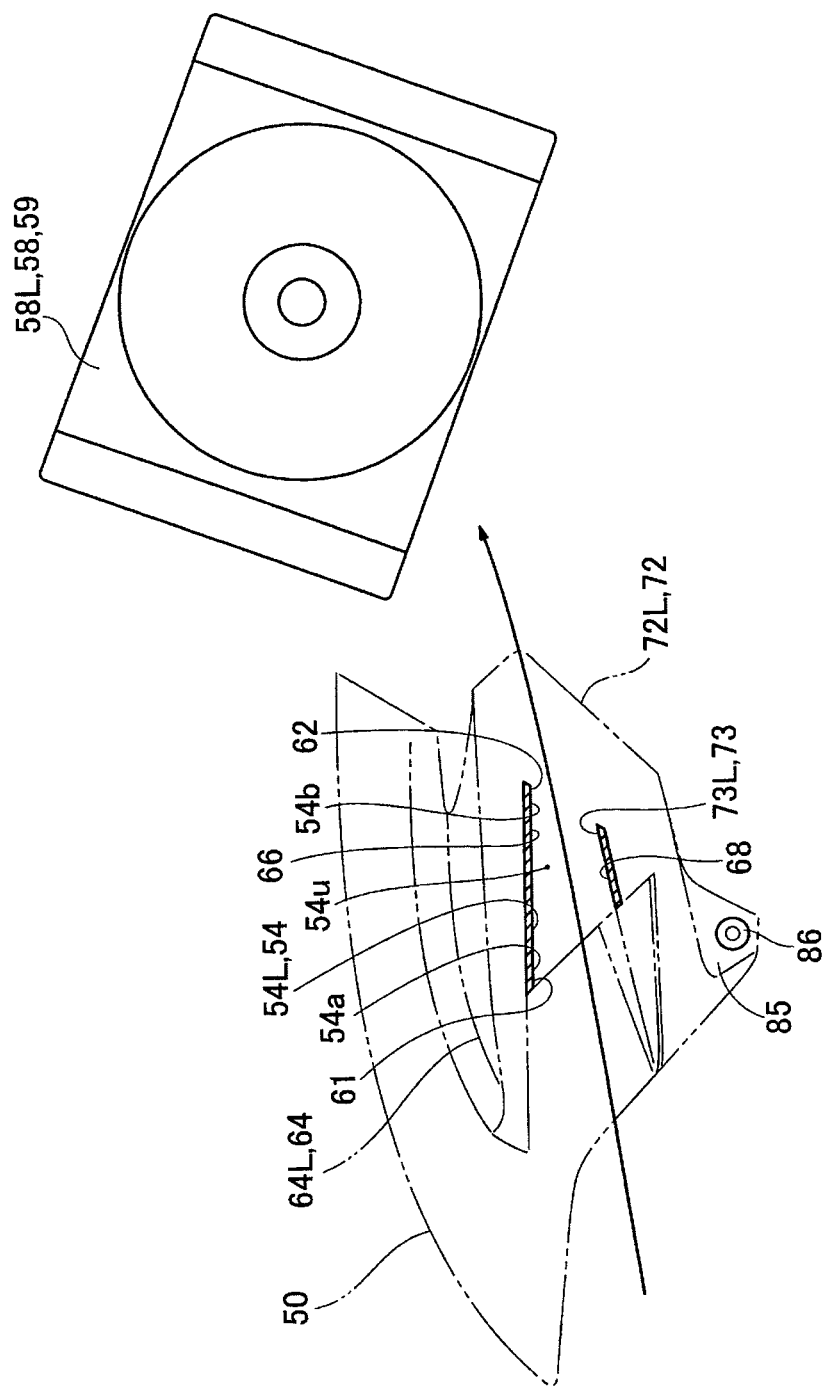
FIG. 6 is a view for explaining the relationship between a duct formed on a fender and a radiator.

As shown in FIG. 6, the ducts 54 are formed on the front fender 50, and the radiators 58 are arranged at a position obliquely rearwardly and upwardly with respect to the ducts 54 in the longitudinal direction of the vehicle. An air intake opening 61 through which a flow of air is taken into the duct 54 is formed at a front end 54a of the duct 54, and an air discharge opening 62 which is directed inward in the vehicle width direction is formed at a rear end 54b of the duct 54. The duct 54 has a ceiling portion 66 and a bottom surface 68 which opposedly face the ceiling portion 66.

Returning to FIG. 4, the ducts 54L, 54R are disposed in a pair on the left and right sides in the vehicle width direction. As viewed from a front side of the vehicle, in the left and right ducts 54L, 54R, the air intake openings 61L, 61R and the air discharge openings 62L, 62R are formed such that the air intake opening 61L and the air discharge opening 62L at least partially overlap with each other, and the air intake opening 61R and the air discharge opening 62R at least partially overlap with each other.

As illustrated in FIGS. 3 and 6, the duct 54L includes a front guide portion 65 projecting toward the front side in the longitudinal direction of the vehicle at the air intake opening 61L. The front guide portion 65 has an extending ceiling portion 67 extending from the ceiling portion 66 of the duct 54; and an extending bottom portion 69 extending from the bottom surface 68 of the duct 54, and an outer side surface 71 in the vehicle width direction which extends between the extending ceiling portion 67 and the extending bottom portion 69 is opened. The duct 54 (see FIG. 6) has a rear guide portion 72 at the air discharge opening 62 disposed on a rear end of an outer surface of the duct 54 such that the rear guide portion 72 extends rearwardly in the longitudinal direction of the vehicle to the outside of the front fork 31 in the vehicle width direction.

The inner surface 54u of the duct 54 is formed of an inclined surface 73 which is directed toward a member to be cooled (radiator 58) disposed in the inside of the vehicle.

Figure 7:
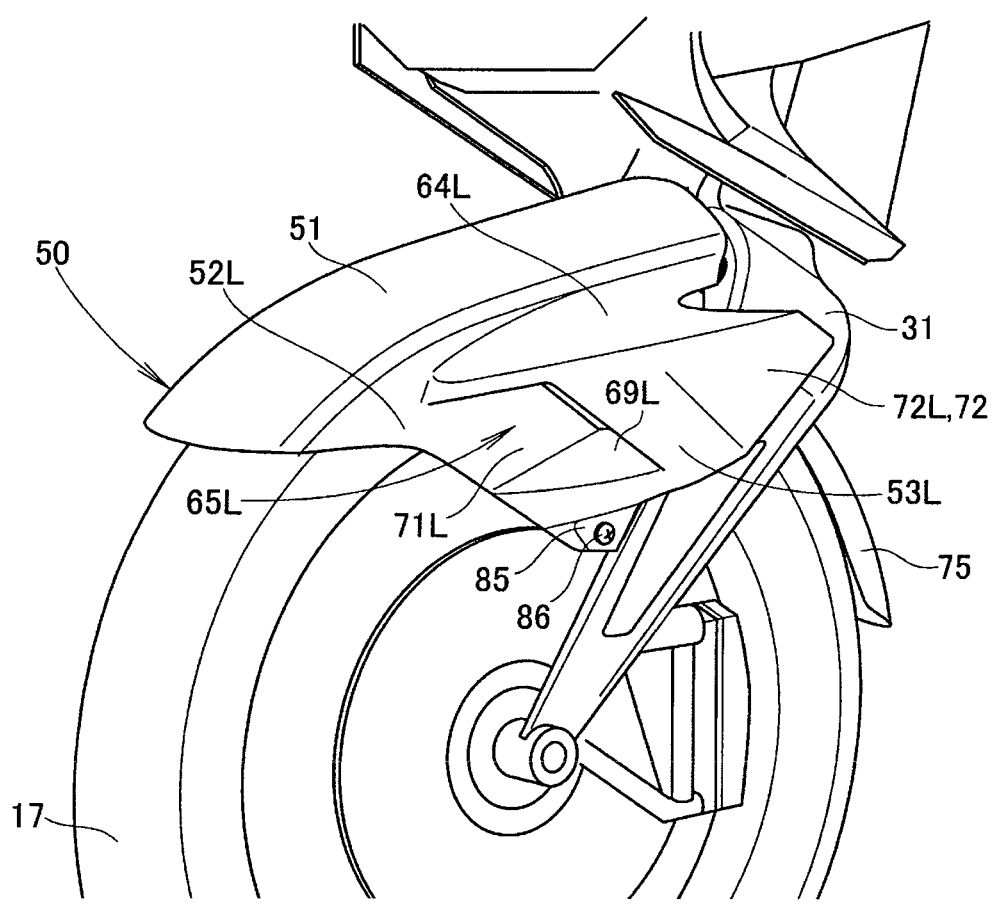
FIG. 7 is a perspective view of a front portion of a vehicle on which the front fender is mounted.

As shown in FIG. 7, recessed portions 64 directed to the members to be cooled (radiators 58 (see FIG. 6)) of the vehicle are formed on a rear portion of an outer surface of an upper portion of the front fender 50. A sub fender 75, formed contiguously with the front fender 50 and extending toward an area behind the front fender 50 for covering the front wheel 17 from a rear upper side, is mounted on the front fork 31.

Figure 8:
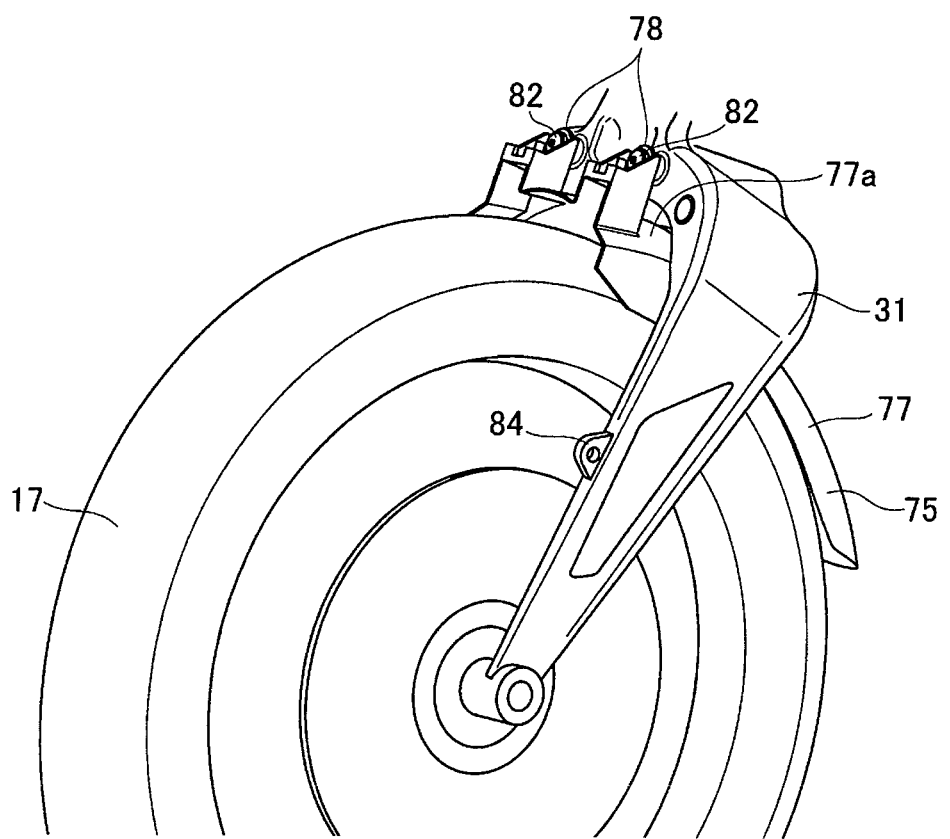
FIG. 8 is a perspective view of the front portion of the vehicle before the front fender is mounted on the front portion of the vehicle.

As shown in FIG. 8, in a state where the front fender 50 (see FIG. 7) is removed from the sub fender 75, the sub fender 75 includes a rear covering portion 77 for covering the front wheel 17 from the rear upper side and a fender mounting portion 78 by which the front fender 50 engages with (is joined to) an upper surface 77a of a front edge portion of the rear covering portion 77.

Figure 9:
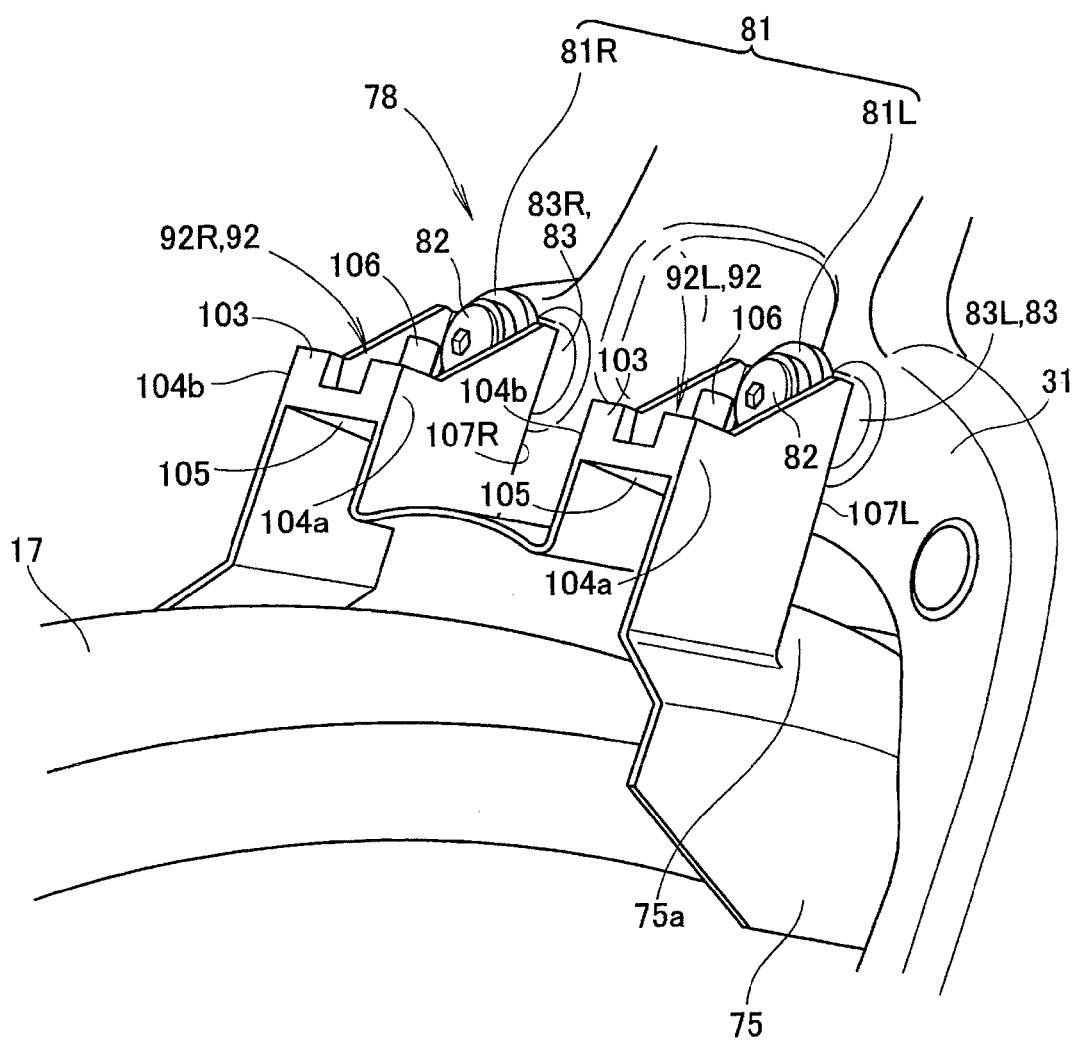
FIG. 9 is an enlarged view of an essential part shown in FIG. 8.

As shown in FIG. 9, mounting flanges 81L, 81R, extending upwardly and mounted on the front fork 31 (see FIG. 7), are formed on an upper surface 75a of the sub fender 75. Boss portions 83L, 83R, on which the mounting flanges 81L, 81R are mounted by fastening members 82, 82, are formed on the front fork 31.

The mounting structure for mounting the front fender on the sub fender or the like is hereinafter explained.

Figure 10:
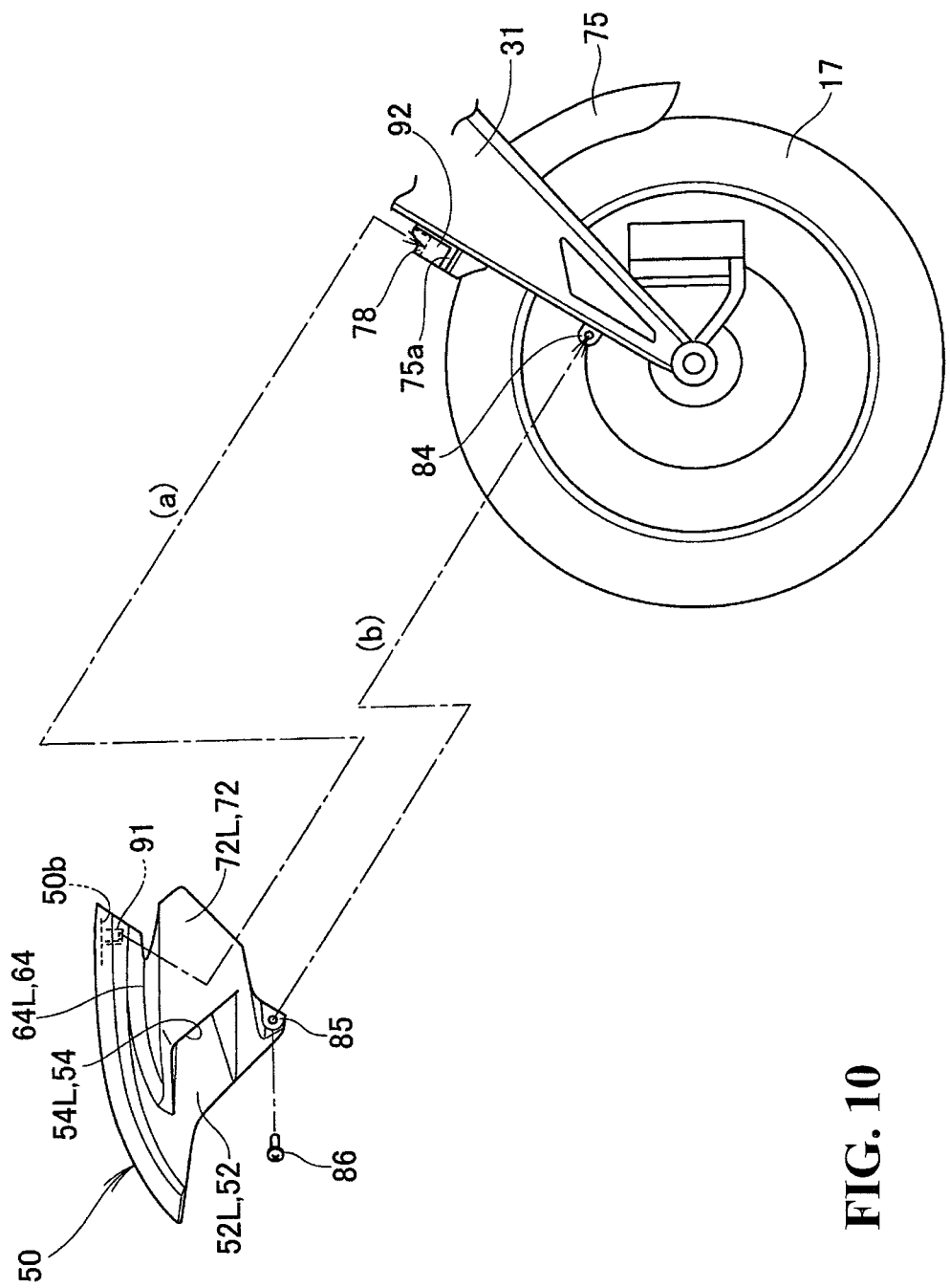
FIG. 10 is an exploded view for explaining the assembling structure of the front fender.

As shown in FIG. 10, the fender mounting portion 78 including the mounting flanges 81L, 81R is mounted on the front fork 31 by the fastening members 82, 82 (see FIG. 9). A lower surface 50b of a rear edge portion of the front fender 50 is joined to the upper surface 75a of a front edge portion of the sub fender 75. Fender flange portions 85 for mounting the front fender 50 to stays 84 of the front fork 31 are formed on lower ends of the left and right covering portions 52 (52L, 52R) of the front fender 50.

In assembling the front fender 50, the lower surfaces 50b of the rear edge portion of the front fender 50 are made to engage with (to be joined to) the upper surfaces 75a of the front edge portion of the sub fender 75 as indicated by an arrow (a) in the drawing. The fender flange portions 85 are set to and made to engage with (to be joined to) the stays 84 of the front fork 31. The fender flange portions 85 are fastened to the stays 84 from the outside in the vehicle width direction as indicated by an arrow (b) in the drawing by fastening screws 86 thus mounting the front fender 50 on the front fork 31.

Figure 11:
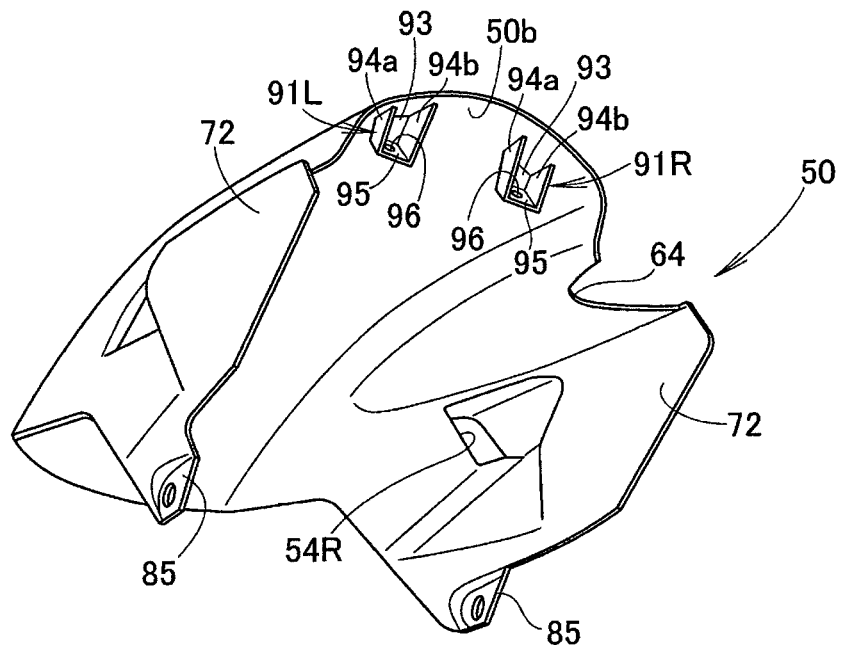
FIG. 11 is a perspective view of the front fender for explaining portions to be positioned.
Figure 12:
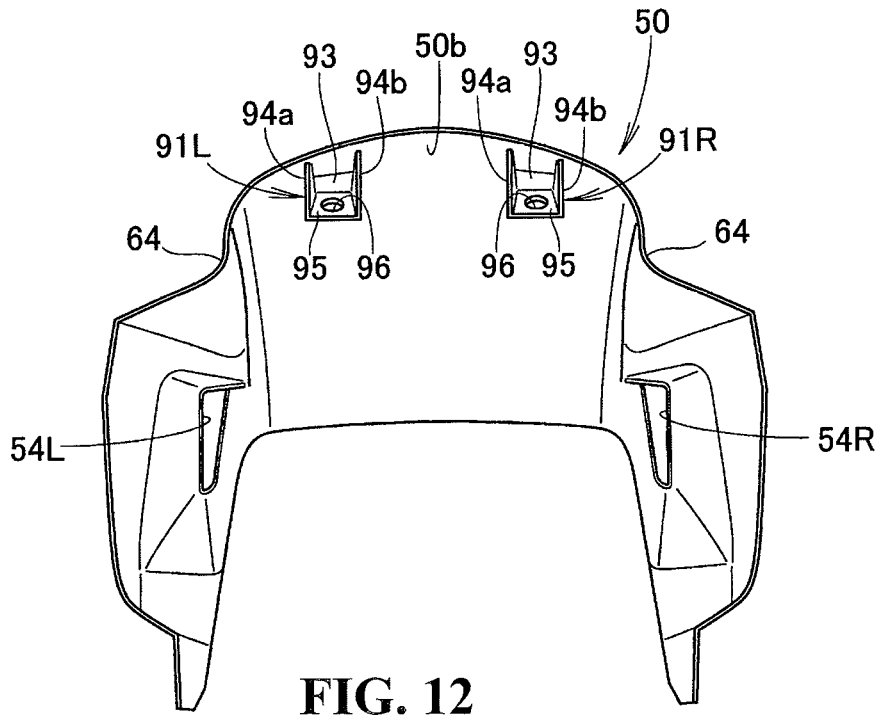
FIG. 12 is a back view of the front fender for explaining the portions to be positioned.

As shown in FIGS. 11 and 12, a pair of left and right portions to be positioned 91L, 91R is formed on a lower surface 50b of the rear edge portion of the front fender 50. The pair of left and right portions to be positioned 91L, 91R is made to engage with (to be joined to) positioning and holding portions 92L, 92R formed on the sub fender 75 (see FIG. 9) side. Each of the pair of left and right portions to be positioned 91L, 91R is formed of: a front vertical wall 93 and side vertical walls 94a, 94b extending downwardly; and a bottom portion 95 extending between lower ends of the front vertical wall 93 and the side vertical walls 94a, 94b, and an engaging hole 96 is formed in the bottom portion 95.

Figure 13A:
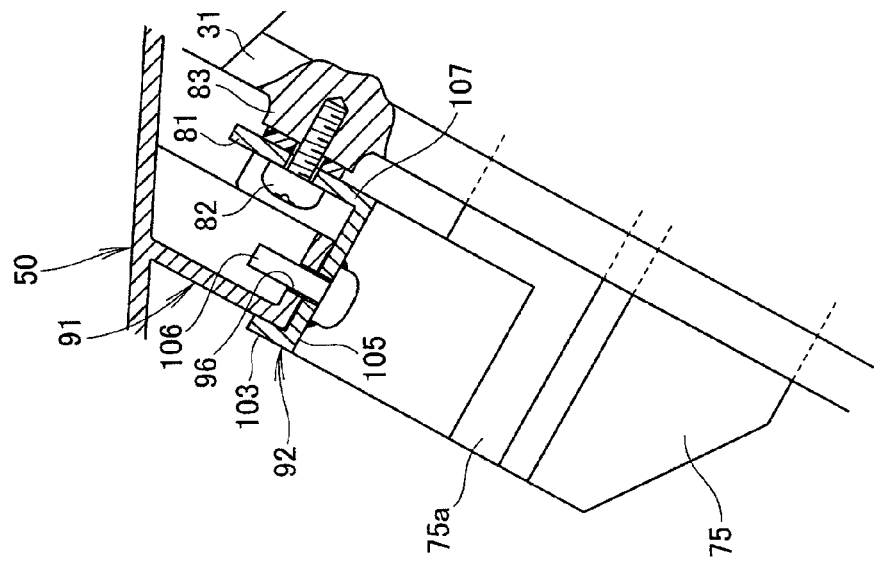
FIG. 13($a$) is a cross-sectional view for explaining a state before the front fender is positioned by and held on a sub fender.
FIG. 13(b) is a cross-sectional view for explaining a state after the front fender is positioned by and held on the sub fender.
Figure 13B:
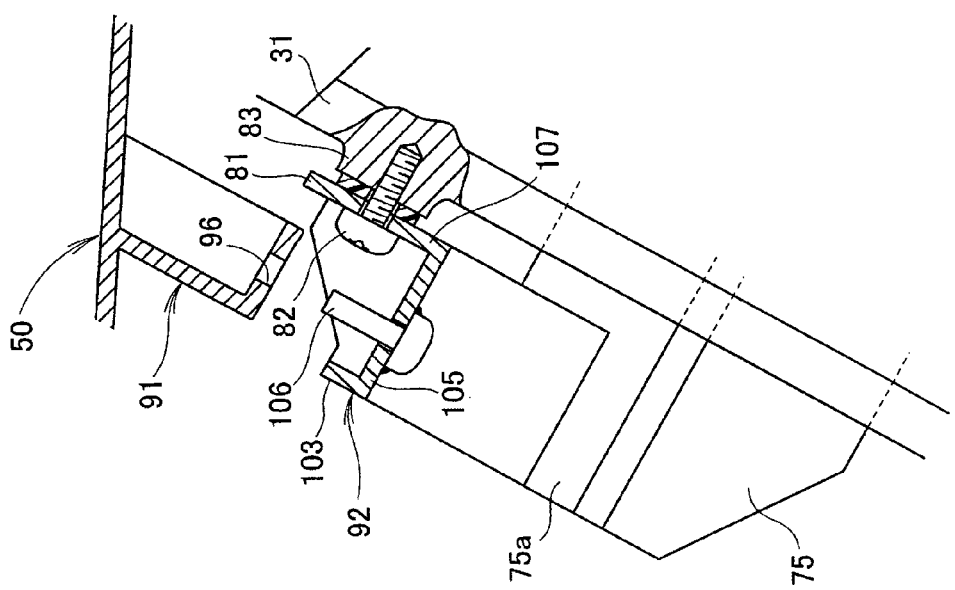

FIG. 13(a) is a cross-sectional view for explaining a state before the front fender is positioned by and held on the sub fender. FIG. 13(b) is a cross-sectional view for explaining a state after the front fender is positioned by and held on the sub fender. In the drawing, the positioning and holding portions disposed on left and right sides in the vehicle width direction respectively have the same structure, and left and right portions to be positioned in the vehicle width direction have the same structure. Thus, the explanation is made while omitting suffixes L, R which indicate left and right sides.

As shown in FIG. 13(a), the mounting flanges 81, extend upwardly and are mounted on the front fork 31, and are formed on the upper surface 75a of the sub fender 75. The boss portions 83, on which the mounting flanges 81 are mounted by the fastening members 82, are formed on the front fork 31.

The sub fender 75 is mounted on the front fork 31, and the positioning and holding portions 92 for positioning the front fender 50 with respect to the sub fender 75 and for holding the front fender 50 are attached to the sub fender 75. The portions to be positioned 91 formed on the front fender 50 are made to engage with the positioning and holding portions 92 from above.

To explain the structure for mounting the front fender on the sub fender also with reference to FIG. 9, each of the positioning and holding portions 92L, 92R has a box shape, and is formed of: a front wall 103; a rear wall 107 arranged so as to opposedly face the front wall 103; one side wall 104a extending between one end of the front wall 103 and one end of the rear wall 107; the other side wall 104b extending between the other end of the front wall 103 and the other end of the rear wall 107; and a bottom wall 105 extending between a lower end of the front wall 103, a lower end of the rear wall 107 and lower ends of one and the other side walls 104a, 104b.

An engaging pin 106, which projects toward the upper side from the lower side of the bottom wall 105, and engages with the engaging hole 96 formed in the front fender 50, is mounted on the bottom wall 105. The rear wall 107 includes the mounting flange 81.

To explain the structure for mounting the front fender on the sub fender also with reference to FIGS. 9, 12 and 13(b), the front fender 50 is positioned by and held on the sub fender 75 such that the left and right side walls 94a, 94b are fitted in and between one side wall 104a and the other side wall 104b of each positioning and holding portion 92 while bringing the front vertical wall 93 of each portion to be positioned 91 in contact with the front wall 103 of each positioning and holding portion 92, and the engaging holes 96 disposed on the front fender 50 side are made to engage with the engaging pins 106 mounted on the sub fender 75 side in a projecting manner.

Conventionally, with respect to a front fender which is configured to be split into a front fender and a rear member, in mounting the front fender on the front fork, there may be a case where the number of mounting portions is increased such as a case where a plurality of fastening portions are provided for fixing the front fender to the front fork. In addition to the above, it is not expected that ducts or the like for guiding a flow of air are formed in the outside of the front fender in the vehicle width direction. Accordingly, it has been difficult to attach the ducts on the front fender.

As illustrated in FIG. 10, according to an embodiment of the present invention, in the fender structure adopting the split structure where the sub fender 75 is mounted on the front fork 31 and the front fender 50 is joined to the sub fender 75, the stays 84 of the front fork 31, which are portions where the front fender 50, is mounted on the vehicle body side are positioned below the ducts 54, and the front fender 50 is mounted on the stays 84 by fastening from outside in the lateral direction using the fastening screws 86. With such structure, the ducts 54 can be easily formed on sides of the front fender 50.

The degree of freedom in designing the ducts 54 is increased so that the ducts 54 can be large-sized without difficulty, for example. By making the ducts 54 large-sized, an effect of straightening the flow of a flow of air can be also increased. By adopting the split structure in forming the front fender 50 having the ducts 54 and the sub fender 75, a molding die for forming the front fender 50 having the ducts 54 can be particularly simplified.

As illustrated in FIGS. 13(a) and 13(b), the mounting flanges 81 extending upwardly are mounted on the upper surface portion 75a of the sub fender 75. By extending the mounting flanges 81 upwardly, for example, the sub fender 75 can be easily mounted on the front fork 31 compared to a case where the mounting flanges extend downwardly.

Further, the positioning and holding portions 92 are attached to the mounting flanges 81, and the front fender 50 is positioned with respect to the sub fender 75 and is held on the sub fender 75 by making the portions to be positioned 91 formed on the front fender 50 engage with the positioning and holding portions 92 from above.

By setting the front fender 50 on the sub fender 75 from above, the front fender 50 can be easily positioned by and held on the sub fender 75. As a result, operability of assembling the front fender 50 and the sub fender 75 to each other can be enhanced.

To explain the mounting structure of the front fender on the sub fender also with reference to FIGS. 9 and 11, each of the positioning and holding portions 92L, 92R has a box shape, and is formed of the front wall 103; the rear wall 107; one side wall 104a; the other side wall 104b; and the bottom wall 105. More specifically, the positioning and holding portions 92L, 92R are formed into a box shape, and the portions to be positioned 91L, 91R are made to engage with the positioning and holding portions 92L, 92R having a box shape.

With such a structure, the strength of the joining portions between the positioning and holding portions 92L, 92R and the portions to be positioned 91L, 91R can be increased. Thus, the joining portions can be miniaturized, and also the number of mounting portions for mounting the fender to the front fork 31 can be reduced. As a result, large-sizing of the ducts 54 and the enhancement of the assembling property of the front fender 50 and the sub fender 75 can be realized.

The manner of operation of the above-mentioned front structure of a motorcycle is described hereinafter.

To explain the manner of operation of the front structure of the motorcycle also with reference to FIGS. 3 and 4, the ducts 54 are formed on the side surfaces of the front fender 50 so as to project sideward in the vehicle width direction.

Assuming a case where a duct is formed on an upper surface of a front fender, it is necessary to ensure a sufficient distance between the duct and a part disposed above the duct so as to prevent the duct from interfering with the part disposed above the duct when the front fender moves up and down during operation of the vehicle. However, it is necessary to increase a vehicle height to ensure a sufficient distance between the duct and the part disposed above the duct, and this increase in the vehicle height is liable to cause an increase in the size of the vehicle.

On the other hand, according to an embodiment of the present invention, the ducts 54 (54L, 54R) which project sideward in the lateral direction of the vehicle are formed on the side surfaces of the front fender 50. By forming the ducts 54 (54L, 54R) such that the ducts 54 (54L, 54R) project sideward in the lateral direction of the vehicle, compared to the case where the duct is formed on an upper surface of the fender, it is possible to form the ducts 54 (54L, 54R) with a wide flow passage area without making the vehicle large-sized. By increasing the flow passage area of the ducts 54 (54L, 54R), a flow straightening effect can be increased. Accordingly, the members to be cooled 59, such as radiators arranged in the inside of the vehicle, can be more effectively cooled without increasing the size of the vehicle. In this embodiment, "flow straightening" means to make the flow of air move at a uniform speed in one direction along lines of flow which are parallel to each other within a limited zone.

The air intake openings 61 (61L, 61R) and the air discharge openings 62 (62L, 62R) are arranged so as to at least partially overlap with each other. By making the air intake openings 61 (61L, 61R) and the air discharge openings 62 (62L, 62R) partially overlap with each other, a turbulence of a flow of air in the ducts 54 (54L, 54R) can be suppressed. Thus, the flow of air easily becomes a smooth flow. As a result, it is possible to accurately direct a flow of air which flows in the ducts 54 (54L, 54R) to the members to be cooled 59 which require cooling.

Returning to FIG. 3, the duct 54 has the front guide portion 65 projecting toward a front side in the longitudinal direction of the vehicle at the air intake opening 61. Accordingly, a flow of air is guided into the air intake opening 61 by being guided by the front guide portion 65. As a result, the flow of air can be effectively guided to the air intake opening 61.

The outer side surface 71 in the vehicle width direction of the front guide portion 65 for taking in a flow of air is opened. By forming the outer side surface 71 which is opened in the vehicle width direction, in addition to the flow of air from a front side of the vehicle, a flow of air from a side of the vehicle can be effectively taken into the air intake opening 61.

Further, the duct 54 has the rear guide portion 72 extending rearwardly in the longitudinal direction of the vehicle at the rear end of the outer surface in a state where the rear guide portion 72 extends to the outside of the front fork 31 in the vehicle width direction. With the provision of the rear guide portion 72, a flow of air leaked to the outside of the front fork 31 can be also accurately guided to the members to be cooled 59 of the vehicle (see FIG. 4).

Returning to FIG. 5, the rear ends 54b of the ducts 54 open to the inside of the inner surfaces 31u of the front fork 31. Further, the planar surfaces 131, 131 of the front fork 31 are arranged contiguously with the rear ends 54b of the ducts 54. The flow of air which flows out from the rear ends 54b of the ducts 54 is smoothly guided toward a rear side of the vehicle along the planar surfaces 131, 131 of the front fork 31 arranged contiguously with the rear ends 54b of the ducts 54. Accordingly, a flow of air which flows through the ducts 54 minimally impinge on the front fork 31 after being discharged from the rear ends of the ducts 54. Thus, it is possible to accurately direct a flow of air to the members to be cooled 59 which require cooling. As a result, the members to be cooled 59 can be effectively cooled.

Returning to FIG. 6, the inner surface 54u of the duct 54 is formed of the inclined surface 73 directed to the member to be cooled 59. By guiding a flow of air along such an inclined surface 73, it is possible to accurately direct the flow of air to the member to be cooled 59. As a result, it is possible to increase an effect of cooling the member to be cooled 59.

The recessed portion 64 directed to the member to be cooled 59 is formed on the rear portion of the outer surface of the upper portion of the front fender 50. A flow of air which impinges on the rear portion of the outer surface of the upper portion of the front fender 50 is directed to the member to be cooled 59 by being guided by the recessed portion 64. As a result, a flow of air which passes the outside of the front fender 50 can be also more accurately directed to the member to be cooled 59.

Although the invention is applied to the motorcycle in this embodiment, the invention is also applicable to a three-wheeled vehicle and may be applied to vehicles in general without causing any problems.

The invention is preferably applicable to a motorcycle provided with a front fender.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front structure of a vehicle comprising:
    a front fork steerably supported on a front portion of a vehicle body frame for supporting a front wheel thereon;
    a front fender provided for preventing debris from being splashed up by the front wheel, said front fender being mounted on the front fork;
    a duct through which a flow of air flows, said duct being formed on a side surface of the front fender such that the duct projects sideward in a lateral direction of the vehicle;
    an air intake opening for taking in the flow of air, said air intake opening being formed on a front end of the duct; and
    an air discharge opening directed inwardly in the vehicle width direction is formed on a rear end of the duct;
    wherein the rear end of the duct opens to an inside of an inner surface of the front fork in the vehicle width direction or to an outside of an outer surface of the front fork in the vehicle width direction;
    the inner surface or the outer surface of the front fork in the vehicle width direction includes a planar surface; and
    a rear end of the duct is formed contiguously with the planar surface.

2. The front structure of a vehicle according to claim 1, wherein the duct has a front guide portion projecting toward a front side in a longitudinal direction of the vehicle at the air intake opening.

3. The front structure of a vehicle according to claim 2, wherein:
    the front guide portion has an extending ceiling portion extending from a ceiling portion of the duct; and an extending bottom portion extending from a bottom surface of the duct; and
    an outer side surface in the vehicle width direction which extends between the extending ceiling portion and the extending bottom portion is opened.

4. The front structure of a vehicle according to claim 1, wherein the duct has a rear guide portion extending rearwardly in the longitudinal direction of the vehicle such that the rear guide portion extends to the outside of the front fork in the vehicle width direction.

5. The front structure of a vehicle according to claim 1, wherein a recessed portion directed to a member to be cooled of the vehicle is formed on a rear portion of an outer surface of an upper portion of the front fender.

6. The front structure of a vehicle according to claim 1, wherein:
    a sub fender extending toward an area behind the front fender is further mounted on the front fork contiguously with the front fender; and
    a lower surface of a rear edge portion of the front fender is joined to an upper surface of a front edge portion of the sub fender, and a fender mounting portion on which a rear surface of a front edge portion of the sub fender is mounted is provided to the front fork.

7. The front structure of a vehicle according to claim 6, wherein:
    a mounting flange extending upwardly and mounted on the front fork is provided to an upper surface of the sub fender;
    a boss portion on which the mounting flange is mounted by a fastening member is provided to the front fork; and
    a positioning and holding portion for positioning the front fender with respect to the sub fender and for holding the front fender on the sub fender by making a portion to be positioned extending in a height direction and formed on the front fender engage with the mounting flange from above is attached to the sub fender.

8. The front structure of a vehicle according to claim 7, wherein:
the positioning and holding portion has a box shape, and is formed of a front wall; a rear wall arranged to opposedly face the front wall; one side wall extending between one end of the front wall and one end of the rear wall; another side wall extending between another end of the front wall and another end of the rear wall; and a bottom wall extending between a lower end of the front wall, a lower end of the rear wall and lower ends of said one and said another side walls; and
the mounting flange is formed on the rear wall.

9. A front structure of a motorcycle comprising:
a front fender provided for preventing debris from being splashed up by a front wheel, said front fender being mounted on a front fork;
a duct for providing a flow of air, said duct being formed on a side surface of the front fender wherein the duct projects sideward in a lateral direction of the motorcycle;
an air intake opening for taking in the flow of air, said air intake opening being formed on a front end of the duct; and
an air discharge opening directed inwardly in the motorcycle width direction, said air discharge opening being formed on a rear end of the duct;
an inner surface or an outer surface of the front fork in the motorcycle width direction includes a planar surface; and
a rear end of the duct is formed contiguously with the planar surface.

10. The front structure of a motorcycle according to claim 9, wherein the rear end of the duct opens to the inside of an inner surface of the front fork in the motorcycle width direction or to the outside of an outer surface of the front fork in the motorcycle width direction.

11. A front structure of a vehicle comprising:
a front fork steerably supported on a front portion of a vehicle body frame for supporting a front wheel thereon;
a front fender provided for preventing debris from being splashed up by the front wheel, said front fender being mounted on the front fork;
a duct through which a flow of air flows, said duct being formed on a side surface of the front fender such that the duct projects sideward in a lateral direction of the vehicle;
an air intake opening for taking in the flow of air, said air intake opening being formed on a front end of the duct;
an air discharge opening directed inwardly in the vehicle width direction is formed on a rear end of the duct;
a sub fender extending toward an area behind the front fender is further mounted on the front fork contiguously with the front fender; and
a lower surface of a rear edge portion of the front fender is joined to an upper surface of a front edge portion of the sub fender, and a fender mounting portion on which a rear surface of a front edge portion of the sub fender is mounted is provided to the front fork.

12. The front structure of a vehicle according to claim 11, wherein the duct has a front guide portion projecting toward a front side in a longitudinal direction of the vehicle at the air intake opening.

13. The front structure of a vehicle according to claim 12, wherein:
the front guide portion has an extending ceiling portion extending from a ceiling portion of the duct; and an extending bottom portion extending from a bottom surface of the duct; and
an outer side surface in the vehicle width direction which extends between the extending ceiling portion and the extending bottom portion is opened.

14. The front structure of a vehicle according to claim 11, wherein the duct has a rear guide portion extending rearwardly in the longitudinal direction of the vehicle such that the rear guide portion extends to the outside of the front fork in the vehicle width direction.

15. The front structure of a vehicle according to claim 11, wherein a recessed portion directed to a member to be cooled of the vehicle is formed on a rear portion of an outer surface of an upper portion of the front fender.

16. The front structure of a vehicle according to claim 11, wherein:
a mounting flange extending upwardly and mounted on the front fork is provided to an upper surface of the sub fender;
a boss portion on which the mounting flange is mounted by a fastening member is provided to the front fork; and
a positioning and holding portion for positioning the front fender with respect to the sub fender and for holding the front fender on the sub fender by making a portion to be positioned extending in a height direction and formed on the front fender engage with the mounting flange from above is attached to the sub fender.

17. The front structure of a vehicle according to claim 16, wherein:
the positioning and holding portion has a box shape, and is formed of a front wall; a rear wall arranged to opposedly face the front wall; one side wall extending between one end of the front wall and one end of the rear wall; another side wall extending between another end of the front wall and another end of the rear wall; and a bottom wall extending between a lower end of the front wall, a lower end of the rear wall and lower ends of said one and said another side walls; and
the mounting flange is formed on the rear wall.

* * * * *